United States Patent
Rudolph et al.

[11] Patent Number: 5,887,090
[45] Date of Patent: Mar. 23, 1999

[54] OPTICAL NETWORK

[75] Inventors: Larry Rudolph, Jersalem; Aharon Agranat, Mevasseret Zion, both of Israel

[73] Assignee: Yissum Research Development Company of the Hebrew University of Jerusalem, Jerusalem, Israel

[21] Appl. No.: 765,377

[22] PCT Filed: Jun. 30, 1995

[86] PCT No.: PCT/US95/08312

§ 371 Date: Apr. 1, 1997

§ 102(e) Date: Apr. 1, 1997

[87] PCT Pub. No.: WO96/01443

PCT Pub. Date: Jan. 18, 1996

[51] Int. Cl.[6] .............................. G02B 6/28; G03H 1/02; G03H 1/12

[52] U.S. Cl. ................ 385/24; 385/37; 385/16; 359/7; 359/10; 359/11; 359/12; 359/127; 359/130; 359/164

[58] Field of Search ................. 385/24, 27, 37, 385/10, 16; 359/3, 7, 10, 11, 12, 25, 35, 127, 130, 159, 164, 173; 364/246; 395/25, 800.11

[56] References Cited

U.S. PATENT DOCUMENTS

| | | | |
|---|---|---|---|
| 3,832,565 | 8/1974 | Graf et al. | 250/566 |
| 3,872,293 | 3/1975 | Green | 359/559 |
| 4,256,927 | 3/1981 | Treheux et al. | 359/25 |
| 5,121,231 | 6/1992 | Jenkins et al. | 359/7 |
| 5,136,666 | 8/1992 | Anderson et al. | 385/24 |
| 5,179,605 | 1/1993 | Kaverhad et al. | 385/37 |
| 5,235,440 | 8/1993 | Clark et al. | 359/11 |
| 5,262,979 | 11/1993 | Chao | 365/49 |
| 5,438,439 | 8/1995 | Mok et al. | 359/11 |
| 5,661,577 | 8/1997 | Jenkins et al. | 359/11 |

FOREIGN PATENT DOCUMENTS

WO 96/01443  1/1996  WIPO.

*Primary Examiner*—Hemang Sanghavi
*Attorney, Agent, or Firm*—Skjerven, Morrill, MacPherson, Franklin & Friel LLP

[57] ABSTRACT

An optical interconnection network in which more than one communication can occur at any give time is disclosed. The interconnection network can form part of a parallel computer, a fiber optic switching network, a massive video or data server or an asynchronous transfer mode (ATM) network. The network includes transmission network elements, reception network elements and a holographic storage element. The holographic storage element is located equidistant form all the transmission and reception network elements and stores therein a multiplicity of holograms. Each volume hologram is responsive to a different angle of incidence of wavelength. Each transmission network element includes a light directing unit which selectively provides at least one light beam of at least one desired angle of incidence to the holographic storage element, which, in turn, redirects each light beam towards a corresponding one of the reception network elements in accordance with the one of the volume holograms responsive to the corresponding angle of incidence.

17 Claims, 6 Drawing Sheets

OPTICAL NETWORK

FIELD OF THE INVENTION

The present invention relates to interconnection networks in general and to holographic interconnection networks in particular. The present invention also relates to parallel computers having such holographic interconnection networks therein.

BACKGROUND OF THE INVENTION

The features which make electronics a wonderful medium for performing computations also make electronics a poor choice for massive high performance communication networks between and within computers. Despite this, a large number of parallel computer architectures, based on electronics, have been proposed and many have been built. They are summarized in the book by G. Lerman and L. Rudolph, *Parallel Evolution of Parallel Processors*, Plenum Press, New York, 1993, which book is incorporated herein by reference.

Currently, most of the commercial parallel supercomputers consist of a multiplicity of high performance processors which communicate via a multi-stage interconnection network. Each processor communicates with the interconnection network via its own specially designed processor-network interface.

The individual processors execute operations in excess of 100 million instructions per second (MIPS), have a local memory in excess of 64 Mbytes and can transmit messages at a rate of tens of Mbytes/second. Modern parallel supercomputers, such as the CM-5 manufactured by Thinking Machines Inc. of Cambridge, Mass., USA, the SP-1 manufactured by International Business Machines Inc. of the USA, the CS-2 manufactured by Meiko of England, the Paragon manufactured by Intel Corporation of the USA and the T3D manufactured by Cray Research Corporation of Maynard, Minn., provide the programmer with the ability to send a message between any pair of processors even if a direct link does not exist between the two processors. Each processor is typically known as a "node".

Since electronic interconnection networks cannot support full interconnectivity (i.e. each processor being directly connected to every other processor), they typically resort to multistaged networks, as described in the book by G. Almasi and A. Gottlieb, *Highly Parallel Computing*, Benjamin-Cummings, 1989, which book is incorporated herein by reference. Unfortunately, in many communication patterns, there are not enough links and therefore, a plurality of messages must use the same communication links. Since at most one message may traverse a link at any time, serious performance degradations can ensue. Moreover, the latency (i.e. the time needed for a message to traverse the interconnection network) increases with the size of the network. At the present time, electronic networks appear to be limited to 500 nodes.

As a result of these drawbacks, optical interconnection networks, supporting thousands of nodes, have been proposed. Some mimic the multistage networks of electronic interconnection networks and, although the optical networks may be faster, they have the same limitations as the electronic ones. Others try to mimic a bus interconnection arrangement; however, this arrangement does not scale easily. Still others route the signals through the network via a central device which, when it is modifying one connection, cannot be utilized for any other task. Finally, there are schemes based on bulk optics which require precise alignment of the optics. Almost all of the designs are on paper only and none of them are appropriate for massively parallel processing in which there are 10,000 or more processors. Furthermore, all of the prior art designs suffer from indeterminant transmission times.

SUMMARY OF THE PRESENT INVENTION

It is, therefore, an object of the present invention to provide an optical interconnection network in which more than one communication can occur at any given time. Accordingly, the interconnection network has a centralized holographic storage element in which are stored a multiplicity of volume holograms. The interconnection network can form part of a massively parallel computer. The interconnection network alternatively can form part of a fiber optic switching network, a massive video or data server or an asynchronous transfer mode (ATM) network.

In accordance with one preferred embodiment of the present invention, the optical interconnection network includes a multiplicity of network elements arranged in a geometric arrangement, such as a sphere, and a holographic storage element centrally located within the geometric arrangement. The structure ensures that the network elements are all equidistant from the holographic storage element.

The holographic storage element has stored therein one volume hologram, responsive to a particular angle of incidence, per communication link between a transmission and a reception network element. Each transmission network element includes a light directing unit and each reception network element includes a light receiving unit. The light directing unit selectively provides a light beam at a desired incidence angle, where, due to the sensitivity of the volume holograms, the desired incidence angle defines the output angle towards the desired reception network element. The light receiving unit receives beams from the holographic storage elements and ensures that only one of the beams is considered at any time.

There is therefore provided, in accordance with a preferred embodiment of the present invention, an optical interconnection network having a first multiplicity of interconnections. The network includes transmission network elements, reception network elements and a holographic storage element located between the transmission and reception network elements. The holographic storage element stores volume holograms, wherein each volume hologram corresponds to one of the interconnections between one of the transmission network elements and one of the reception network elements. The transmission network elements communicate with the reception network elements by illuminating the holographic storage element with light at desired position and angles of incidence corresponding to desired reception network elements thereby to activate the corresponding volume hologram. Additionally, in accordance with a preferred embodiment of the present invention, the light directing unit includes a spatial light modulator formed of a multiplicity of selectable modulator elements, at least one for each reception network element with which communication is desired. The modulator elements can be activated individually or a set of modulator elements can be activated. In the latter case, the result can be communication with many reception network elements or it can be with a single reception network element which requires many copies of the same message.

Moreover, in accordance with a preferred embodiment of the present invention, each of the reception network elements comprises a light detecting unit for detecting and receiving light from the holographic storage element and for enabling a predetermined number of communications to occur. The light detecting unit can be formed of a single light detector which enables only a single communication at a time, or it can be formed of a matrix of detector elements. In the latter case, the light detecting unit additionally includes a pre-processor which, when a communication is initiated by activating at least one detector element, disables all non-activated detector elements. The light detecting unit can also be capable of receiving a set of light beams from one transmission network element at one time.

Finally, the network preferably includes a calibration unit locatable at positions symmetrically across from a desired reception network element for use in implanting the volume holograms corresponding to the desired reception network element.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
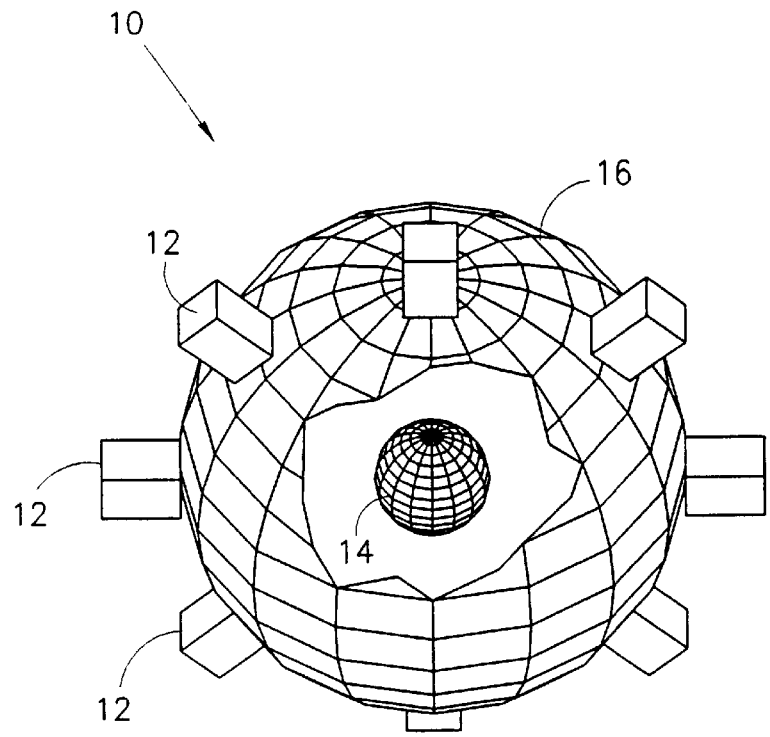
FIG. 1 is a schematic illustration of a holographic interconnection network, constructed and operative in accordance with a preferred embodiment of the present invention.
Figure 2:
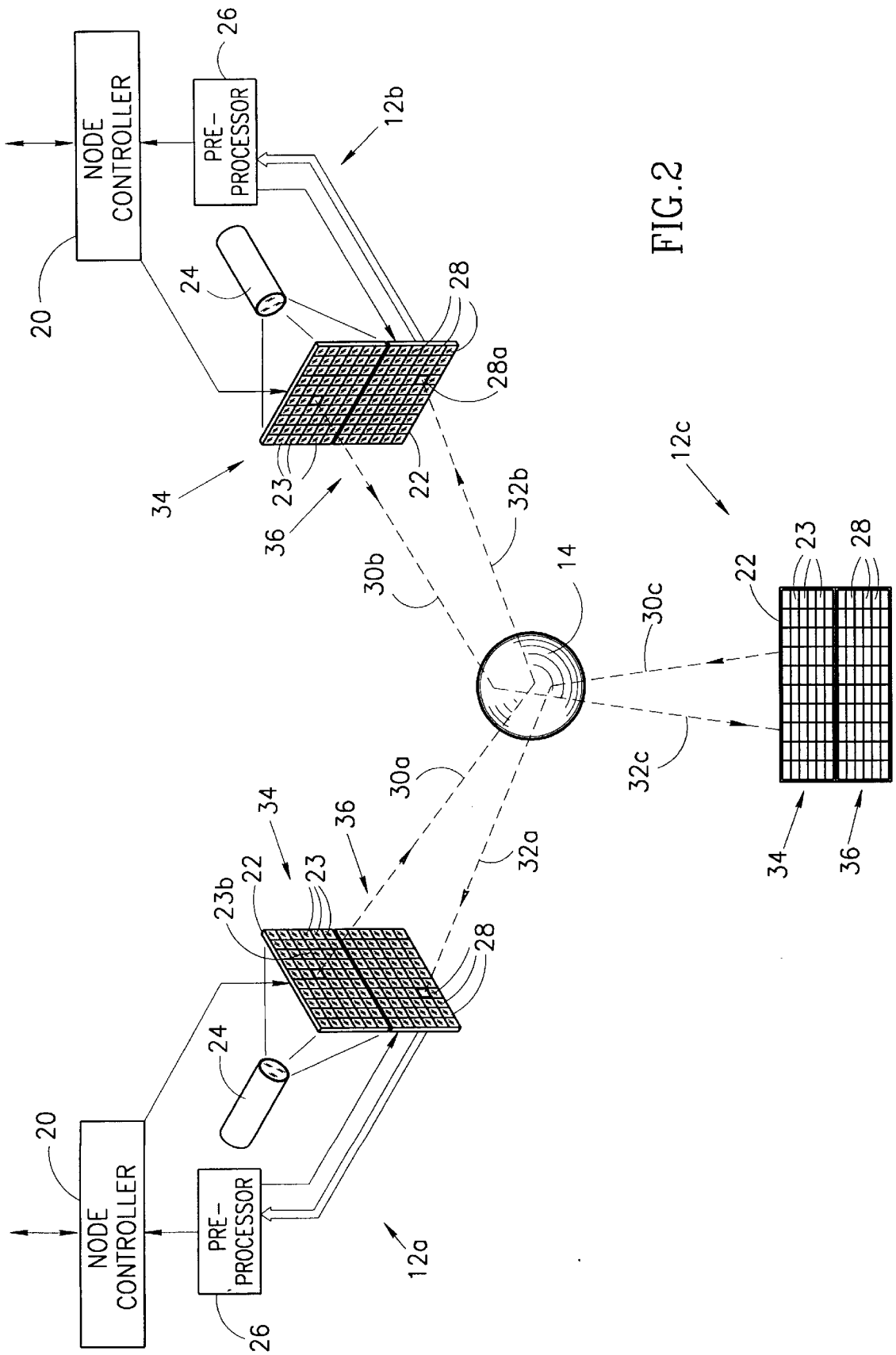
FIG. 2 is a schematic illustration of elements of the interconnection network of FIG. 1.

Reference is now made to FIGS. 1 and 2 which illustrate a holographic interconnection network 10, constructed and operative in accordance with a preferred embodiment of the present invention. It is noted that, in the drawings, optical connections are indicated by dashed lines and non-optical connections are indicated by solid lines.

The interconnection network 10 typically comprises a multiplicity of network elements 12 arranged in a geometric arrangement, such as a sphere 16. The network elements communicate with each other via a holographic storage element 14 centrally located within the sphere 16. For parallel computers, each network element 12 would be connected to one processing unit of the computer.

The holographic storage element 14 stores volume holograms therein. Typically, the number of volume holograms stored is equal to the number of interconnections between network elements which are desired. For example, if there are N network elements and it is desired that each network element speak with all of the others, then there are $N^2$ volume holograms stored in storage element 14.

As is discussed in the book by R. J. Collier et al *Optical Holography*, Academic Press, 1971, which book is incorporated herein by reference, volume holograms respond uniquely to light at a specific angles of incidence (i.e. illumination at one angle of incidence will be bent along only one optical path). Light at differing wavelengths will also have the same effect. The present invention will be described with respect to angles of incidence, it being appreciated that a similar network responding to wavelengths is also within the purview of the present invention.

Due to this specificity, many uncoupled optical paths can be defined within the holographic storage element 14 and illumination of one path (at a specific angle or a specific wavelength) will not generate illumination along any other path. Thus, many network elements 12 can communicate through holographic storage element 14 at one time and the angle of incidence of a light beam defines the desired interconnection.

The network elements 12 communicate with each other by transmitting incoming light beams at a given angle to the holographic storage element 14. The storage element 14 in turn, redirects each light beam to its destination network element 12, in accordance with the volume hologram which responds to the angle of the incoming light beam. For example, in order to send a message from a first network element, labeled 12a, to a second network element, labeled 12b, the first network element 12a provides an incoming light beam 30, to be called herein a "source light beam", at an angle corresponding to the second network element 12b. When illuminated with the source light beam 30 at the selected angle of incidence, the volume hologram corresponding to the interconnection from network element 12a to network element 12b is activated. This volume hologram bends the source light beam 30 into a "destination" light beam 32 directed towards the destination network element 12b. Thus, the destination of a message is defined by the angle of illumination of the holographic storage element 14.

FIG. 2 illustrates the conversations of three network elements 12a, 12b and 12c, all of which occur at the same time. Network element 12a sends a message to element 12b, network element 12b sends a message to element 12c and network element 12c sends a message to element 12a. The source beams are labeled 30a, 30b and 30c and are respectively produced by network elements 12a, 12b and 12c. The corresponding destination beams are labeled 32a, 32b and 32c. Because the communications are through the holographic storage element which has a different volume hologram per interconnection and because the source beams 32a, 32b and 32c are mutually incoherent, all three communications can occur at the same time, as described hereinabove.

It is noted that the path from a first network element to a second network element is not the same as the path from the second network element to the first. Thus, each interconnection is a one-way communication path.

Since all network elements 12 are on the sphere 16, they are equidistant from holographic storage element 14. Since all communication is through the holographic storage element 14, all light beams, both source and destination, have optical paths of equal lengths. It is noted that the network elements 12 can be placed around any geometric arrangement that ensures that all of the light beams have optical paths of equal lengths. The remaining description will utilize the sphere; it being recognized that this is by way of example only.

In the embodiment of FIG. 2, each network element 12 comprises an node controller 20, a spatial light modulator and detector unit 22, a modulated light source 24 of temporally modulated light, and a pre-processor 26. The modulated light source 24 produces light which is temporally modulated with data to be transmitted.

The spatial light modulator and detector unit 22 comprises a modulator matrix 34 of spatial light modulator elements 23 for providing source light beams 30 and a detector matrix 36 of detector elements 28 for receiving destination light beams 32.

The modulator matrix 34 is lit by the temporally modulated light from light source 24. If the interconnection network of the present invention is implemented in a parallel computer, the light source 24 is typically formed of a laser having a frequency which is suitable for the holographic storage element 14 and a modulating element for temporally modulating the light emitted by the laser. If the holographic storage element is formed of Lithium Niobate doped with iron ($LiNbO_3$:Fe), a diode pumped double YANG laser providing green light, is appropriate.

As can be seen in FIG. 2, each network element 12 and, therefore, each unit 22 is at a different location on the sphere 16 (FIG. 1). In addition, each spatial light modulating element 23 of each unit 22 is at a slightly different angle to the holographic storage element 14. Therefore, each element 23 corresponds to and enables communication with a different network element 12.

It is noted that the elements 23 can be any appropriate type of spatial light modulating elements known in the art. They can be operated such that only one element 23 is active at once or such that a predetermined number can be active at once. In the latter case, the same message is provided to many destination network elements.

It is further noted that each detector element 28 is located at a slightly different angle to the holographic storage element 14. Therefore, each detector element 28 defines a different angle for the destination light beams 32.

The node controller 20 typically controls unit 22, activating the spatial light modulating element 23 which corresponds to the desired destination network element 12. For the example of network elements 12a and 12b communicating, element 23b is activated. The network element 12a utilizes the selected pixel 23b to emit light beam 30a.

As mentioned hereinabove, the holographic storage element 14 bends light beam 30a into light beam 32b. Beam 32b impinges upon detector element 28a of the unit 22 corresponding to network element 12b, wherein detector element 28a corresponds to network element 12a. The detector element 28a is typically a photodetector. Each detector 28 provides a modulated signal to the preprocessor 26 when a light beam impinges upon it. It is noted that the pre-processor 26 can be separate from or integral with the detector matrix 34.

Pre-processor 26 can operate in many different ways. Typically, it ensures that, at any one time, only one detector element 28 is active. Alternatively, the pre-processor 26 can enable a predetermined number of detector elements 28.

If the interconnection network of the present invention is implemented into a parallel computer, the pre-processor 26 also converts the modulated signal provided by the active detector element 28 into a format, typically digital, which the processor connected to the network element 12 understands. To prevent many communications from occurring at once, as soon as one detector element 28 becomes active, the pre-processor 26 disables all the other detector elements 28 for the duration of the communication.

It will be appreciated that any network element 12 can, at the same time, send a message to one processor and receive a message from another processor. Alternatively, a sending processor can provide the same message to a plurality of processors by activating a plurality of modulating elements 23 at one time.

The detector matrix 36 can be implemented in a number of ways, all of which must ensure that a predetermined number of communications are enabled at any one time. It can be formed of a single detector element 28. The holographic storage element 14 is designed to direct beams from any sending network element 12 to the single detector element 28. It will be appreciated that, in this embodiment, the information regarding which network element 12 initiated the communication must be in the message being sent.

However, this embodiment requires that no two light beams impinge on the single detector element at the same time. Hardware arbitration circuitry can be used to avoid simultaneous transmissions.

Figure 3A:
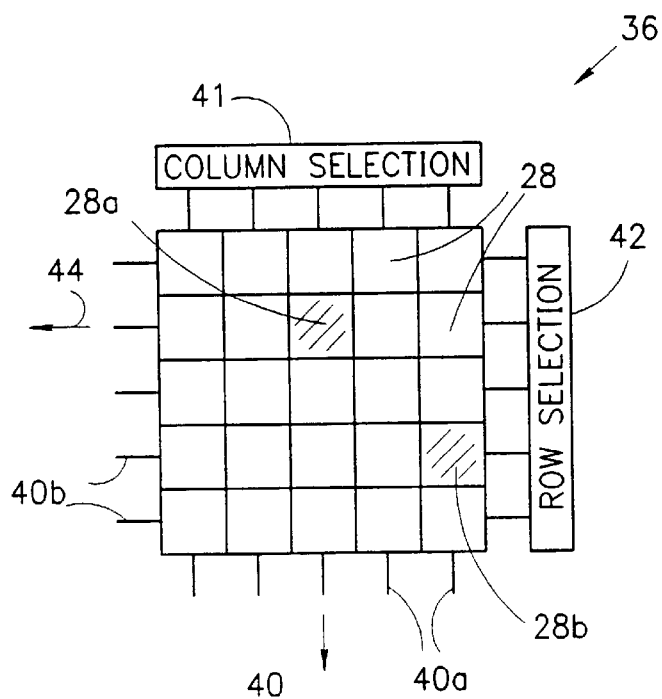
FIGS. 3A and 3B are schematic illustrations of two alternative detector units forming part of the interconnection network of FIG. 2.
Figure 3B:
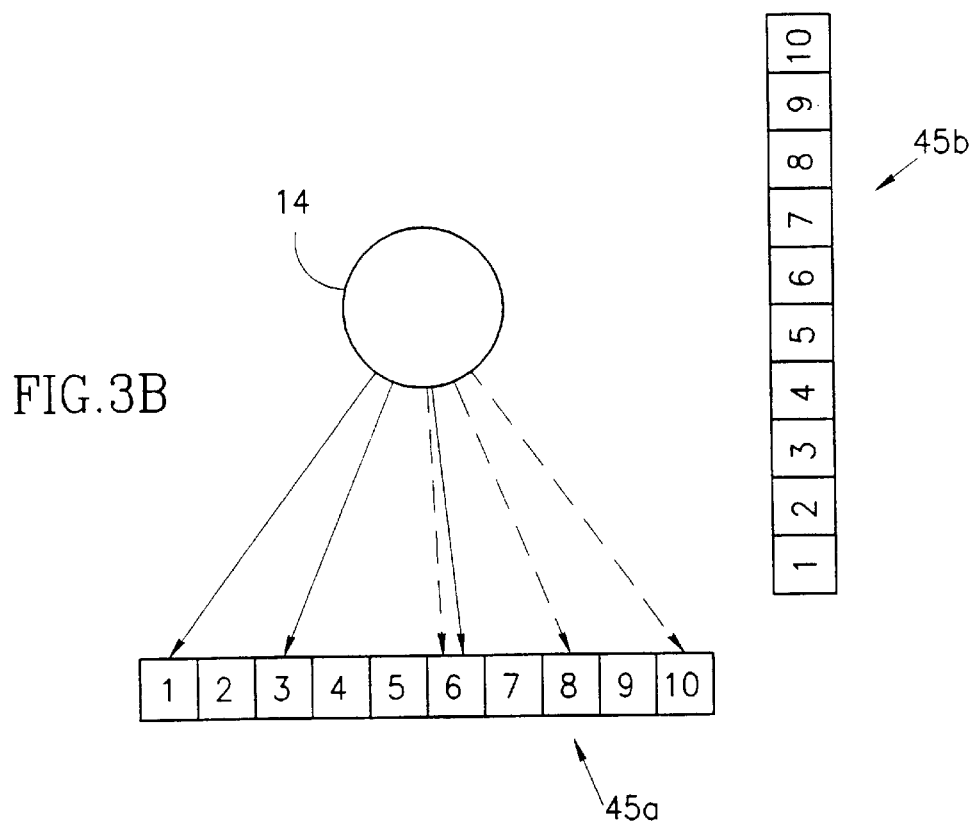

The detector matrix 36 can alternatively be implemented as a matrix of detector elements 28, as generally illustrated in FIG. 2 and detailed in FIGS. 3A and 3B to which reference is now made. In the embodiment of FIG. 3A, the detector matrix 36 is a two-dimensional matrix of detector elements 28, one per interconnection, with output pins 40a per column and 40b per row. Matrix 36 also includes column and row selection circuitry 41 and 42, respectively, for selecting a column or row for reading. Initially, column selection circuitry 41 is operative and continually scans the column output pins 40b. Since only a few detector elements 28 are likely to be active at any one time, most of the columns will have no activity on them (equivalent to a logical "0"). FIG.3A shows two active detector elements 28a and 28b.

The row and column selection circuits 41 and 42 are typically implemented to perform a "winner-takes-all" circuit such that, as soon as it is determined that a detector element 28, such as 28a, is active, the output of the remaining detector elements 28 are disabled. In this embodiment, only one communication at a time is allowed.

A further alternative embodiment is illustrated in FIG. 3B. In this embodiment, the detector matrix 36 is much smaller and can be implemented as a linear array 45 or as a matrix. In this embodiment, the sending network element 12 sends multiple copies, for example three, of its message to the destination network element 12. Each sending network element 12 has its own combination of detector elements 28 to which it sends, through the holographic storage element 14. For example, a first network element 12 might send to the detector elements labeled 1, 3 and 6 (illustrated with solid lines) and a second might send to detector elements 6, 8 and 10 (illustrated with dashed lines).

In the embodiment of FIG. 3B, if one of the copies of the message is corrupted, since another message was sent to that detector element 28 at the same time, one or more of the other copies of the message will not be corrupted at the same time. This is because no two network elements 12 activate exactly the same detector elements 28. If the first network element 12 is currently sending a message, it has activated detector elements 1, 3 and 6. The detector array 45 disables all elements but 1, 3 and 6. When the second network element 12 begins sending, it will attempt to activate detector elements 6, 8 and 10. Since detectors 8 and 11 are already disabled, they will have no effect. But the communication with detector element 6, when the first network element 12 is already communicating with detector element 6, will cause the output of detector element 6 to be corrupted. An output circuitry (not shown) which detects corrupted signals ignores the output of detector element 6 and only utilizes the output of detector elements 1 and 3. Since the output of detector elements 1 and 3 are identical, only one of them is really needed to ensure that the message is properly sent.

In a further embodiment, a dual-rail implementation is utilized in which there are two detector arrays 45, one (labeled 45a) for receiving logical "1"s and one (labeled 45b) for receiving logical "0"s. Each network element 12 sends to the same set of detector elements in each detector array 45. Thus, the first network element 12 sends to detector elements 1, 3 and 6 of each detector array 45, depending on the logical value of the data being transmitted.

Figure 4A:
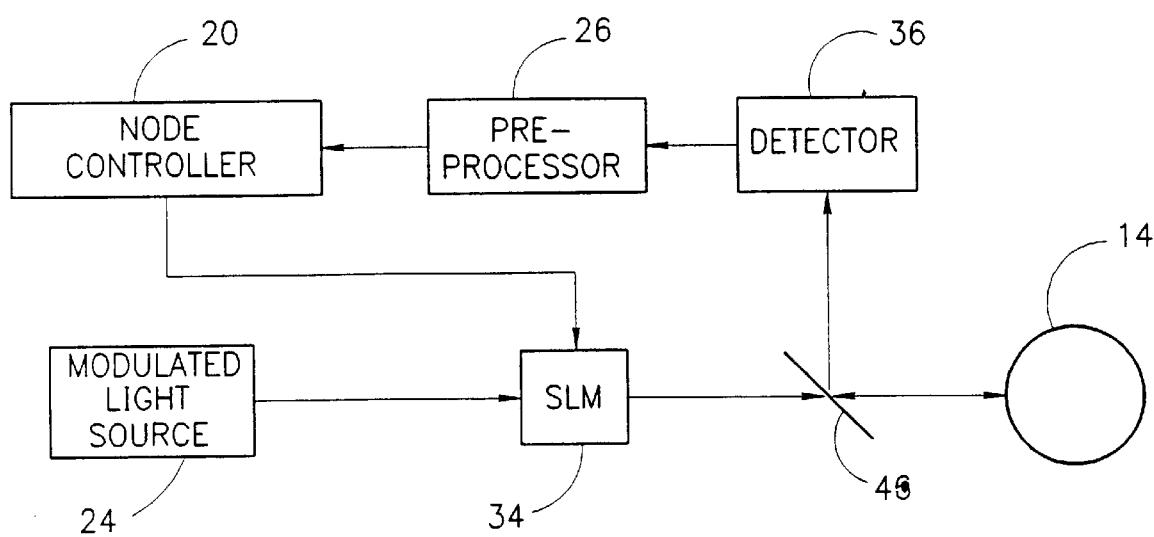
FIG. 4A is a schematic illustration of an alternative embodiment of a network element forming part of the interconnection network of FIG. 2.
Figure 4B:
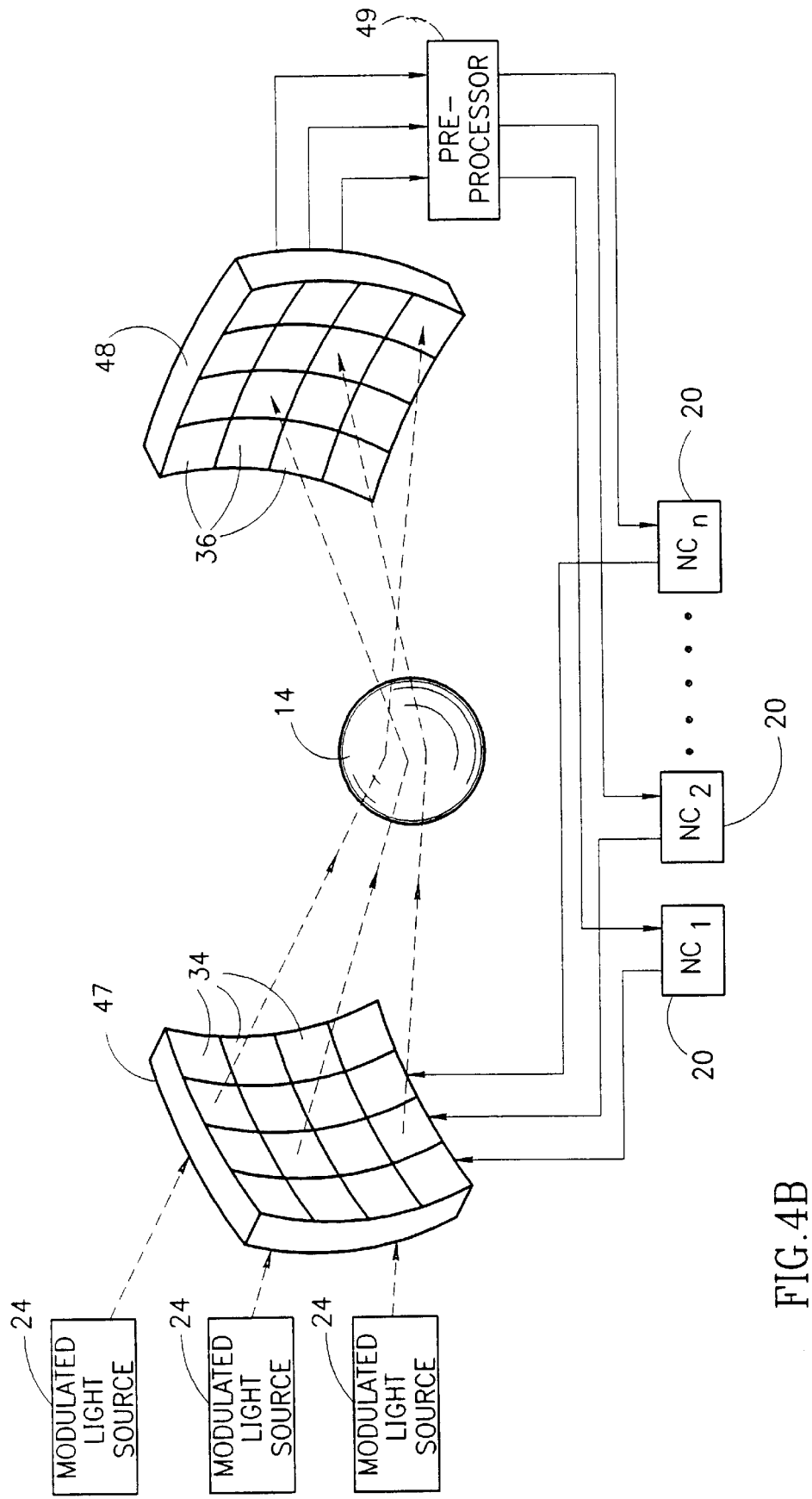
FIG. 4B is a schematic illustration of an alternative format of the interconnection network of FIG. 2.

It is noted that the detector matrix 36 and spatial light modulator matrix 34 do not have to be implemented into the single unit 22 shown in FIG. 2. Reference is now briefly made to FIGS. 4A and 4B which illustrate two embodiments of a network element 12 which separate the detector and spatial light modulator matrices 36 and 34, respectively. Similar elements are indicated with similar reference numerals.

FIG. 4A is a simplified illustration of one network element which comprises the node controller 20, light source 24, and pre-processor 26 as described hereinabove. The spatial light modulator (SLM) matrix 34 and detector matrix 36 are separated and the light which they respectively emit and receive are processed by a beam splitter 46. Beam splitter 46 passes the outgoing light beams from the spatial light modulator matrix 34 and bends the incoming light beams towards the detector matrix 36. It is noted that matrices 34 and 36 are located so as to ensure that the source light paths from the spatial light modulator matrix 34 to the holographic storage element 14 are of an equivalent length to the destination light paths back to the detector matrix 36.

FIG. 4B is a schematic representation of an interconnection network in which at least some of the spatial light modulator matrices 34 of the different network elements 12 are combined together into a single unit 47 and at least some of the detector matrices 36 are combined together into a single unit 48. Each network element 12 still comprises its own light source 24 and node controller (NC) 20; however, the pre-processors 26 can either be separate, or combined into a single pre-processor 49, as shown. Each light source 24 is operative only for its corresponding spatial light modulator matrix 34.

Since the units 47 and 48 are large compared to the individual matrices, the units 47 and 48 may have to be curved so as to maintain the matrices 34 and 36, respectively, along the surface of sphere 16 (FIG. 1). Since only the matrices 34 and 36 operate with light beams (noted by dashed lines), the remaining communication being performed via electronic connections (noted by solid lines), only matrices 34 and 36 have to be placed on the surface of the sphere 16. The remaining elements, such as the node controllers 20, can be placed elsewhere, as noted in FIG. 4B. It is noted that each node controller 20 still communicates with its corresponding spatial light modulator matrix 34 and detector matrix 36.

Figure 5:
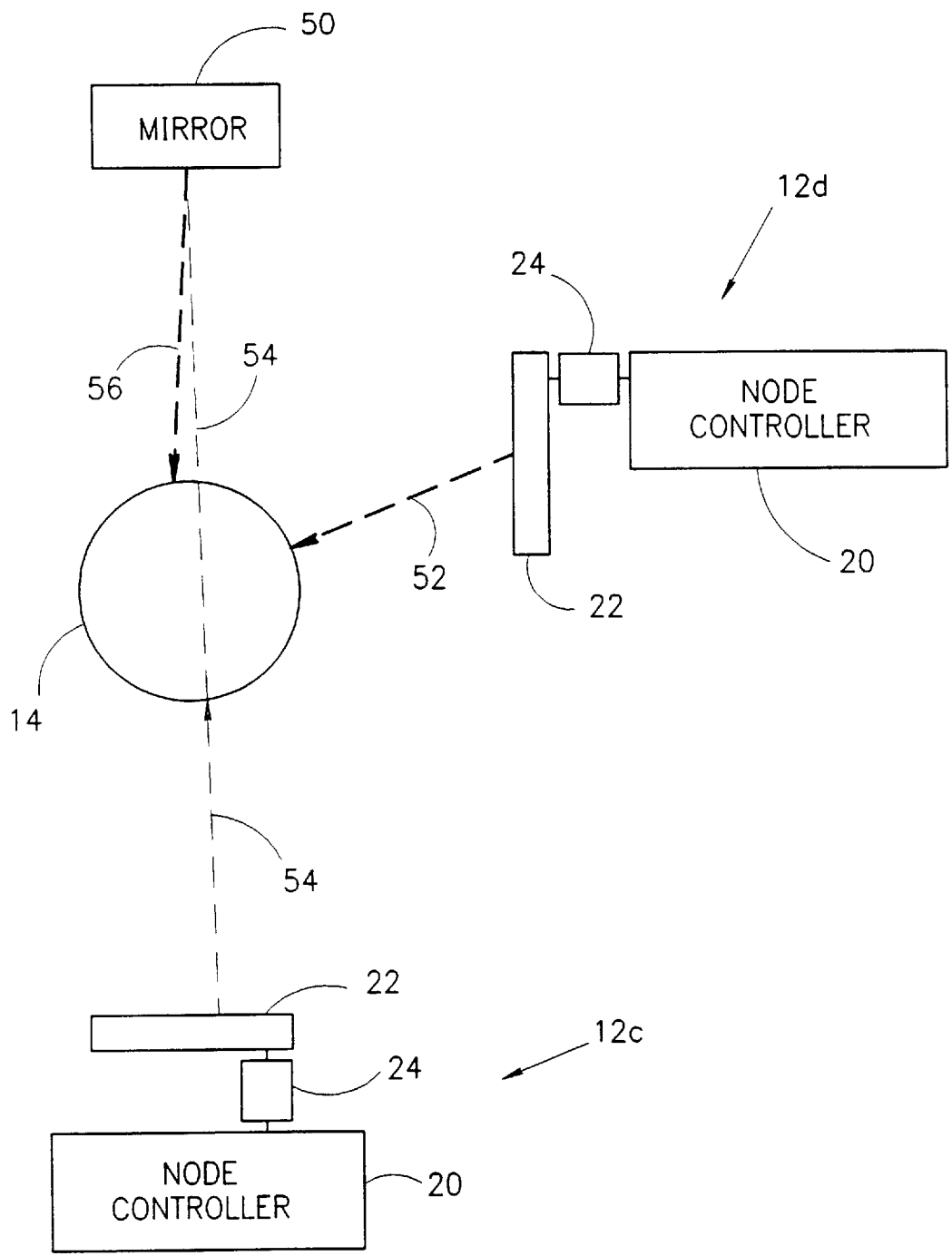
FIG. 5 is a schematic illustration of apparatus for calibrating a holographic storage element forming part of the interconnection network of FIG. 2.

Reference is now made to FIG. 5 which illustrates a system by which the volume holograms are created within the holographic storage element 14, which is typically formed of a crystal, such as one made of Lithium Niobate doped with iron ($LiNbO_3$:Fe). The system shown in FIG. 5 is typically operative with the embodiment of the network elements 12 shown in FIG. 4A.

To create a hologram in a crystal, two light beams must be shone on the crystal, one from the input direction and one along the symmetric reflection of the desired output direction. Once the hologram is "fixed", as will be described later, light from the input direction will cause light to go out the output direction.

The network elements 12 are typically placed at their locations on the sphere 16 (FIG. 1) and the holographic storage element 14 is placed in its location concentric to the center of sphere 16. To create the optical path from a network element, labeled 12d, to a network element, labeled 12c, (i.e. illumination from network element 12d will cause the light to bend towards network element 12c), a phase conjugate mirror 50 is placed directly opposite network element 12c, in order to create a light beam 56 headed in the output direction toward network element 12c.

Both network elements 12d and 12c emit light, through their respective units 22, towards the holographic storage element 14. The emitted light beams are labeled 52 and 54. Some of light beam 54 from network element 12c will pass the holographic storage element 14 and impinge upon mirror 50 which will return it, as light beam 56, towards network element 12c. Since the light beam 54 is of low intensity and therefore, not intense enough to implant the holographic information, mirror 50 is a phase conjugate mirror which produces beam 56 which is typically more intense than impinging beam 54. The beam 56, in conjunction with the less intense input beam 52, is intense enough to create the relevant volume hologram. It is noted that the reference beam 52 and beam 56 must be coherent.

Mirror 50 remains in its location for the creation of all of the optical paths towards network element 12c. This involves consecutively activating the light sources 24 and appropriate spatial light modulator elements 23 of each network element 12. Afterwards, mirror 50 moves to a location opposite another network element 12 and the process repeated. Once all of the volume holograms have been created, the holographic storage element 14 is treated, in accordance with known treatments, so as to fix the holograms therein.

Figure 6:
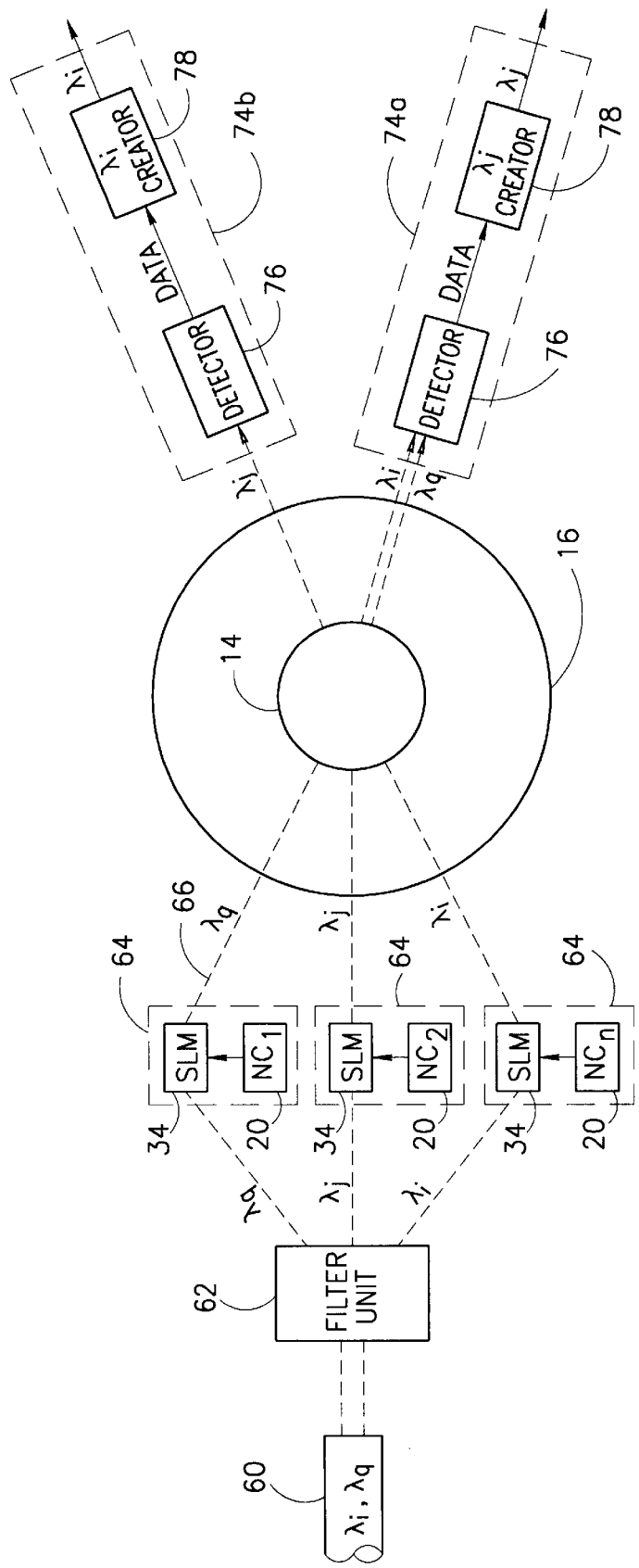
FIG. 6 is a schematic illustration of a wavelength division multiplexer (WDM) utilizing the holographic interconnection network of the present invention.

It will be appreciated that the holographic interconnection network of the present invention can be utilized anywhere where optical interconnections are desired and where it is desired to have many communications occurring at the same time. Reference is now made to FIG. 6 which illustrates a wavelength division multiplexer (WDM) which utilizes the holographic interconnection network of the present invention. In effect, in this embodiment, the holographic interconnection network acts as a big switchboard for a fiber optic network.

WDMs convert the wavelengths of light signals carried on fiber optic waveguides 60. Each fiber optic waveguide 60 carries on it many different channels of signals, each channel being defined by a different wavelength. Thus, the fiber optic waveguide 60 may carry the channels denoted by $\lambda_i$, $\lambda_j$ and $\lambda_q$. The WDM is operative to convert the wavelengths from one wavelength to another one, as desired. By changing wavelengths, the signal being carried is switched from one channel to another.

In accordance with this alternative embodiment of the present invention, the holographic interconnection network is utilized to direct the signals from one channel to another one. The transmitting side comprises a filtering unit 62, comprising a plurality of filters each attuned to the wavelength of one channel, to separate the signals into their separate channels. For each channel, the transmitting side also comprises a transmission unit is 64 comprising the transmission elements of a network element 12. Each transmission unit 64 comprises an node controller 20 and a spatial light modulator matrix 34 located on the surface of the sphere 16 at whose center is located the holographic storage element 14. On the receiving side are a plurality of wavelength changing apparatus 74, one for each outgoing channel or wavelength λ.

As in the previous embodiment, the node controller 20 activates the matrix element of modulator matrix 34 which corresponds to the desired destination. The activated matrix element emits a light beam, for example beam 66, having its corresponding wavelength $\lambda_q$ at an incidence angle corresponding with the desired output wavelength. The holographic storage element 14 redirects the source light beams, regardless of their wavelengths, in accordance with their incidence angle. The redirected beam is received by the appropriate wavelength changing apparatus 74 which, in turn, produces a corresponding output signal with the desired wavelength.

Each wavelength changing apparatus 74 typically comprises a detector 76 and a new channel creator 78. The detector 76 is similar to the detector matrix 36 of the previous embodiment in that it detects the incidence of light upon it and ensures that only one communication occurs at any one time. Furthermore, detector 76 demodulates the data temporally modulated in the light beam and thus, produces a data signal representing the data carried by the light beam. Detector 76 can be formed of many detector elements or just one, as described hereinabove.

Creator 78 includes therein a laser at the desired outgoing wavelength. Upon receipt of the data signal, creator 78 modulates the output of its laser in accordance with the data signal. The result is a modulated signal with the desired outgoing wavelength, or, in other words, on the desired channel.

FIG. 6 illustrates the conversion of the three source light beams having wavelengths $\lambda_i$, $\lambda_j$ and $\lambda_q$ into two outgoing light beams having wavelengths $\lambda_j$ and $\lambda_i$. Each source light beam is processed by its own transmission unit 64 and illuminates the holographic storage element 14 at the angle defining the desired output wavelength. The beams having wavelengths $\lambda_i$ and $\lambda_q$ are redirected to wavelength changing apparatus 74a and the beam having wavelength $\lambda_j$ is redirected to wavelength changing apparatus 74b. Typically, if two beams fall on a detector 76, the earliest one will be processed. Therefore, the node controllers 20 have to be coordinated so as to ensure that each source beam is directed to an available wavelength changing apparatus 74. This is especially true if the WDM is to act as a switchboard.

It will be appreciated by persons skilled in the art that the holographic interconnection network of the present invention has a number of features. A network element can transmit, at once, the same message to a desired number of destination network elements. This "multi-casting" occurs whenever the spatial light modulator matrix 34 activates more than one spatial light modulator element 23 at one time.

Due to the sensitivity of the holographic storage element 14, a multiplicity of communications can occur at the same time between different network elements. These communications are independent of each other and therefore, do not require centralized coordination in order to occur. Since the communications are independent, the failure of one node will not cause the entire network to fail.

Finally, it will be appreciated that, since all of the network elements are similar, network elements can be added or removed as desired.

It will be appreciated that the holographic interconnection networks of the present invention can be implemented in any device which requires many interconnections between operating devices. For example, the holographic interconnection network can form part of a massively parallel computer. Alternatively, it can form part of a network of video or data servers. Furthermore, it can be utilized as the interconnection unit for asynchronous transfer mode (ATM) networks.

It will be appreciated by persons skilled in the art that the present invention is not limited to what has been particularly shown and described hereinabove. Rather the scope of the present invention is defined by the claims which follow:

We claim:

1. An optical interconnection network comprising:
   a first multiplicity of transmission network elements formed into a first plurality of transmission units;
   a second multiplicity of reception network elements formed into a second plurality of reception units; and
   a holographic storage element located equidistant from all of said transmission and reception network elements and storing therein a third multiplicity of volume holograms, each responsive to a different angle of incidence and each associated with a different interconnection between one of said transmission network elements and one of said reception network elements;
   wherein each of said transmission units comprises a light directing unit for selectively providing at least one light beam, through at least one transmission network element, at least one desired angle of incidence to said holographic storage element, and
   wherein said holographic storage element redirects each of said at least one light beam towards a corresponding one of said reception network elements in accordance with the one of said volume holograms responsive to the corresponding angle of incidence.

2. An optical interconnection network according to claim 1 and wherein said light directing unit comprises a spatial light modulator comprising a multiplicity of selectable modulator elements, one for each reception network element with which communication is desired.

3. An optical interconnection network according to claim 1 and wherein each of said reception units comprises a light detecting unit for detecting and receiving light from said holographic storage element and for enabling a predetermined number of communications to occur.

4. An optical interconnection network according to claim 3 and wherein said light detecting unit comprises a single light detector and enables only a single communication at a time.

5. An optical interconnection network according to claim 3 and wherein said light detecting unit comprises one detector element for each transmission network element with which communication is desired and a pre-processor for, when a communication is initiated by activating at least one detector element, for disabling all non-activated detector elements.

6. An optical interconnection network according to claim 3 and wherein said light detecting unit comprises a matrix of detector elements, a column selector and a row selector, wherein said column selector continually scans columns of said array and said row selector puts out signals from said detector elements of a column only once said column selector receives an indication of light reception on at least one of the detector elements in said column.

7. An optical interconnection network according to claim 3 and wherein said light detecting unit comprises an array of detector elements, said array being capable of receiving a set of light beams from one transmission network element at one time.

8. An optical interconnection network according to claim 1 wherein said light directing unit comprises a spatial light modulator comprising a multiplicity of selectable modulator elements, wherein a predetermined number of said modulator elements correspond to each reception network element with which communication is desired, wherein each of said reception network elements comprises a light detecting unit for detecting and receiving light from said predetermined number of spatial light modulator elements through said holographic storage element and for enabling corresponding communications to occur.

9. An optical interconnection network according to claim 1 and additionally comprising a node controller for controlling said light directing unit and for receiving output of said light directing unit.

10. An optical interconnection network according to claim 9 and wherein said node controller activates more than one spatial light modulating element at a time.

11. An optical interconnection network according to claim 1 and additionally comprising a calibration unit locatable at positions symmetrically across from a desired reception network element for use in implanting the volume holograms corresponding to said desired reception network element.

12. An optical interconnection network having a first multiplicity of interconnections, the network comprising:
   a second multiplicity of transmission network elements;
   a third multiplicity of reception network elements; and
   a holographic storage element located between said transmission and reception network elements and storing therein a first multiplicity of volume holograms, wherein each volume hologram corresponds to one of said interconnections between one of said transmission network elements and one of said reception network elements,
   wherein said transmission network elements communicate with said reception network elements by illuminating said holographic storage element with light at desired angles of incidence corresponding to desired reception network elements thereby to activate the corresponding volume hologram.

13. A parallel computer comprising:
   a multiplicity of processors; and
   an optical interconnection network optically connecting said multiplicity of processors,
   wherein said optical interconnection network has a first multiplicity of interconnections and comprises:
      a second multiplicity of transmission network elements;
      a third multiplicity of reception network elements; and
      a holographic storage element located between said transmission and reception network elements and storing therein a first multiplicity of volume holograms, wherein each volume hologram corresponds to one of said interconnections between one of said transmission network elements and one of said reception network elements,
   wherein said transmission network elements communicate with said reception network elements by illuminating said holographic storage element with light at desired angles of incidence corresponding to desired reception network elements thereby to activate the corresponding volume hologram.

14. A fiber optic switching network comprising:
   a multiplicity of fiber optic cables; and
   an optical interconnection network optically connecting said multiplicity of fiber optic cables,
   wherein said optical interconnection network has a first multiplicity of interconnections and comprises:
      a second multiplicity of transmission network elements;
      a third multiplicity of reception network elements; and
      a holographic storage element located between said transmission and reception network elements and storing therein a first multiplicity of volume holograms, wherein each volume hologram corresponds to one of said interconnections between one of said transmission network elements and one of said reception network elements,
   wherein said transmission network elements communicate with said reception network elements by illuminating said holographic storage element with light at desired angles of incidence corresponding to desired reception network elements thereby to activate the corresponding volume hologram.

15. An optical interconnection network for connecting a multiplicity of video servers, the network comprising:
   a first multiplicity of transmission network elements;
   a second multiplicity of reception network elements; and
   a holographic storage element located equidistant from all of said transmission and reception network elements and storing therein a third multiplicity of volume holograms, each responsive to a different angle of incidence and each associated with a different interconnection between one of said transmission network elements and one of said reception network elements,
   wherein each of said transmission network elements comprises a light directing unit for selectively providing at least one light beam at least one desired angle of incidence to said holographic storage element, and
   wherein said holographic storage element redirects each of said at least one light beam towards a corresponding one of said reception network elements in accordance with the one of said volume holograms responsive to the corresponding angle of incidence.

16. An optical interconnection network for connecting a multiplicity of data servers, the network comprising:
   a first multiplicity of transmission network elements forming a first plurality of transmission units;
   a second multiplicity of reception network elements forming a second plurality of reception units; and
   a holographic storage element located equidistant from all of said transmission and reception network elements and storing therein a third multiplicity of volume holograms, each responsive to a different angle of incidence,
   wherein each of said transmission units comprises a light directing unit for selectively providing at least one light beam, through at least one transmission network element, at least one desired angle of incidence to said holographic storage element, and
   wherein said holographic storage element redirects each of said at least one light beam towards a corresponding one of said reception network elements in accordance with the one of said volume holograms responsive to the corresponding angle of incidence.

17. An optical asynchronous transfer mode (ATM) interconnection network, the network comprising:

a first multiplicity of transmission network elements forming a first plurality of transmission units;

a second multiplicity of reception network elements forming a second plurality of reception units; and a holographic storage element located equidistant from all of said transmission and reception network elements and storing therein a third multiplicity of volume holograms, each responsive to a different angle of incidence, wherein each of said transmission units comprises a light directing unit for selectively providing at least one light beam, through at least one transmission network element, at least one desired angle of incidence to said holographic storage element, and wherein said holographic storage element redirects each of said at least one light beam towards a corresponding one of said reception network elements in accordance with the one of said volume holograms responsive to the corresponding angle of incidence.

* * * * *